United States Patent [19]

Prete, Jr.

[11] 4,324,022

[45] Apr. 13, 1982

[54] RATCHET BUCKLE HAVING REINFORCEMENT STRENGTHENING MEANS

[75] Inventor: Ernest Prete, Jr., Woodland Hills, Calif.

[73] Assignee: Ancra Corporation, El Segundo, Calif.

[21] Appl. No.: 159,958

[22] Filed: Jun. 16, 1980

[51] Int. Cl.³ .................... B25B 25/00; B65D 67/02
[52] U.S. Cl. ................................ 24/68 CD; 24/71.2; 24/68 R
[58] Field of Search ............. 24/68 R, 68 CD, 68 D, 24/68 BT, 71.2; 254/222, 223, 247, 248, 217, 218, 249

[56] References Cited

U.S. PATENT DOCUMENTS

| | | | |
|---|---|---|---|
| 3,180,623 | 4/1965 | Huber | 24/71.2 X |
| 3,826,473 | 7/1974 | Huber | 24/68 CD X |
| 4,155,537 | 5/1979 | Bronson et al. | 24/71.2 |
| 4,185,360 | 1/1980 | Prete, Jr. | 24/68 CD |
| 4,199,182 | 4/1980 | Sunesson | 24/68 CD |
| 4,227,286 | 10/1980 | Holmberg | 24/68 CD |
| 4,268,012 | 5/1981 | Ruehle et al. | 254/223 |

Primary Examiner—Roy D. Frazier
Assistant Examiner—Peter A. Aschenbrenner
Attorney, Agent, or Firm—Edward A. Sokolski

[57] ABSTRACT

A ratchet buckle for tightening and tensioning straps includes a bifurcated frame member having a pair of oppositely positioned parallel arms between which a reel member and ratchet wheels are rotatably mounted. A strap to be tensioned is reeved through the reel member. A bifurcated lever member, having a pair of oppositely positioned parallel arms, is rotated on the reel and has a ratchet drive plate which engages the teeth of the ratchet wheel such that when the lever is actuated the reel is rotatably driven. A portion of the load on the frame is transferred to the lever when the buckle is in its closed position, thereby substantially increasing the strength-to-weight ratio of the device by providing tab members and notches which matingly engage each other with the handle in its tensioned or closed position, one of these two engaging members being on the arms of the lever and the other of these members being on the frame.

5 Claims, 6 Drawing Figures

RATCHET BUCKLE HAVING REINFORCEMENT STRENGTHENING MEANS

This invention relates to ratchet buckles for tightening and tensioning straps, and more particularly to such a buckle which employs a ratchet mechanism which has members on the handle and frame thereof which matingly engage each other in the tensioned closed position so as to provide structural reinforcement for the buckle.

In U.S. Pat. No. 4,185,360, issued Jan. 29, 1980, and assigned to Ancra Corporation, the assignee of the present application, a ratchet buckle is described for tightening and tensioning straps in which a portion of the load on the frame member is transferred to the handle of the device by providing a cross member running between the arms of the handle which seats in notches formed in the arms of the frame when the handle is in its finally closed position. As pointed out in the aforementioned patent, this substantially increases the effective strength-to-weight ration of the device and, for a given design, enables the handling of greater loads.

The device of the present invention provides such reinforcement in a simpler, more economical manner, and therefore for certain application requirements affords advantages thereover.

In the present invention, such reinforcement is achieved by providing notches formed in the oppositely positioned parallel arms of one of the members (i.e., either the handle or the frame) and tabs on the oppositely positioned parallel arms of the other of such members which matingly engage the notches when the device is in its finally closedly position.

It is therefore an object of this invention to provide simple and economical means for transferring a portion of the load from the ratchet buckle frame to the operating lever of a ratchet buckle.

It is still a further object of this invention to improve the strength-to-weight ratio of a ratchet buckle device without adding significantly to the cost of such device.

Other objects of this device will become apparent as the description proceeds in connection with the accompanying drawings of which:

Figure 1:
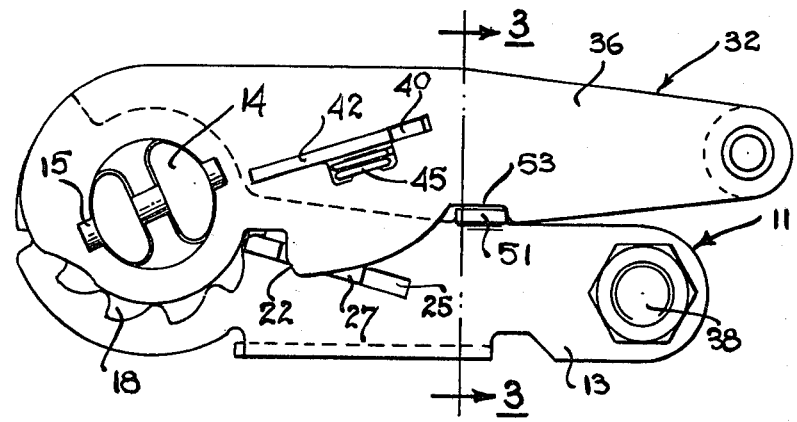
FIG. 1 is a side elevational view of a first embodiment of the invention.

The general features of the buckle which employs the present invention are basically the same as that described in the aforementioned U.S. Pat. No. 4,185,360, differing only with regard to the reinforcement means employed. Therefore, the ratchet buckle device of the present invention will be but briefly described herein except for the special features of improvement provided related to the reinforcement means. The device of the present invention includes a bifurcated frame member 11 which has a pair of oppositely positioned parallel arms 12 and 13. Reel member 14 is formed from a pair of bars which are joined together at their end portions by means of pins 15 and is rotatably mounted on frame 11 between arms 12 and 13. Mounted on reel member 14 in fixed position relative thereto are a pair of ratchet wheels, only one of which (18) is shown. Mounted for longitudinal motion in slots 25 is latching plate 27. Latching plate 27 is urged by means of a spring (not shown) which forces the ends of the latching plate against ratchet wheel 18 and the similar oppositely positioned ratchet wheel which is not shown, thus holding the ratchet wheels in a latched condition at times other than when lever member 32 is being lifted away from frame 11. A strap member (not shown) to be tensioned is wound around reel 14 as lever member 32 is raised and lowered relative to frame 11. A bar member 38 runs between arms 12 and 13 and is fixedly attached or anchored to a member relative to which the strap is to be tensioned, as for example, the wall of a vehicle. Lever member 32 has a pair of oppositely positioned parallel arms 34 and 36, these arms being rotatably supported on reel 14 between the ratchet wheel 18 (and its associated opposite ratchet wheel) and pin 15. Slidably mounted in elongated slot 40 is a ratchet drive plate 42 which engages the ratchet wheel 18 (and its associated opposite ratchet wheel) in response to the urging of spring 45 against plate 42. Thus far, the device as described is identical to that of the aforementioned U.S. Pat. No. 4,185,360.

Figure 3:
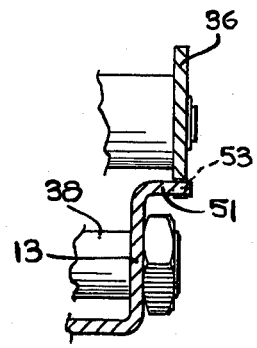
FIG. 3 is a cross-sectional view taken along the plane indicated by 3—3 in FIG. 1.
Figure 2:
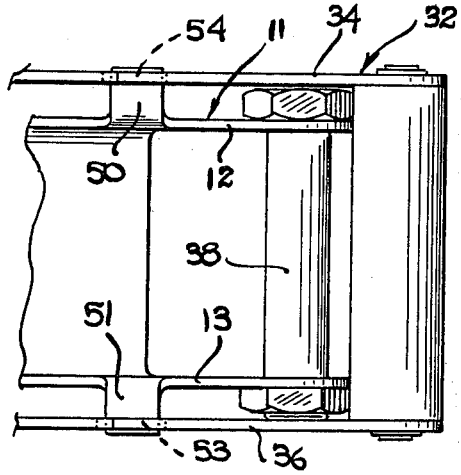
FIG. 2 is a top plan view of a portion of the ratchet buckle of FIG. 1.

The present invention is involved with tab members 50 and 51 which extend outwardly from frame member arms 12 and 13, respectively, and notches 53 and 54 which are formed in arms 36 and 34 respectively and which matingly engage tabs 50 and 51 when lever member 32 is in its finally "closed" position relative to frame member 11 (as shown in FIGS. 1-3).

In operation, the strap is tensioned by raising and lowering lever 32 relative to frame 11, ratchet drive plate 42 driving the ratchet wheel as the lever is moved upwardly with latching plate 27 retaining the ratchet wheels in position while the lever is moving downwardly over the arcuate portions of the ratchet wheel teeth. When the finally tensioned condition is reached, lever 32 is placed downwardly in a closed (locked) position, as shown in the figures. As the lever enters this position, camming surfaces 22 (only one shown) abut against latching plate 27 and drive this latching plate into firm engagement with the ratchet wheel. In the closed position, tabs 50 and 51 are seated in notches 54 and 53 respectively, which effectively joins the lever and the frame together insofar as tensile loads imparted by the strap are concerned, thus providing the desired reinforcement action which enables the device to handle greater loads than would otherwise be possible.

Figure 4:
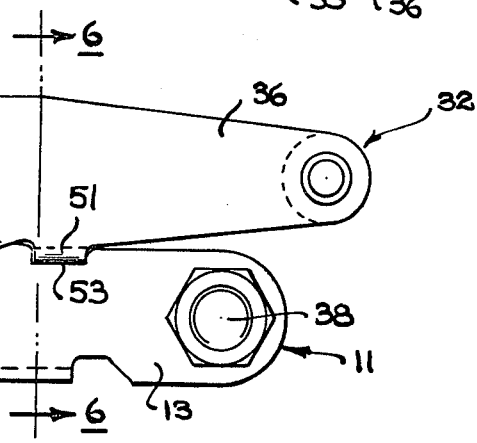
FIG. 4 is a side elevational view showing a portion of the ratchet buckle incorporating a second embodiment of the invention.
Figure 6:
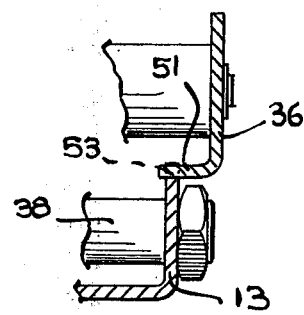
FIG. 6 is a cross-sectional view taken along the plane indicated by 6—6 in FIG. 4.
Figure 5:
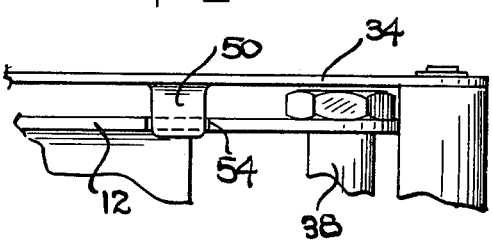
FIG. 5 is a top plan view illustrating a portion of the ratchet buckle of FIG. 4.

Referring now to FIGS. 4-6, a second embodiment of the invention is illustrated. This second embodiment is similar to the first except for the fact that in this instance the tab members 50 and 51 are formed on the arms 34 and 36 respectively of lever member 32 while the notches 54 and 53 that mate therewith are formed on the arms 12 and 13 respectively of frame member 11. Otherwise, the structure and operation is the same as that of the first embodiment.

While the invention has been described and illustrated in detail, it is to be clearly understood that this is intended by way of illustration and example only and is not to be taken by way of limitation, the spirit and scope of this invention being limited only by the terms of the following claims.

I claim:

1. In a ratchet buckle for use in tightening and tensioning strap including a frame member with a pair of oppositely positioned arms, a reel member rotatably supported between said arms, a pair of ratchet wheels fixedly attached to said reel member in spaced apart relationship and a latching plate slidably mounted between said arms for latching said ratchet wheels when they are not being rotatably driven; and a lever member having a pair of oppositely positioned arms rotatably mounted on the reel member and a ratchet drive plate slidably mounted between the lever member arms which engages and drives said ratchet wheel when the lever member is actuated, the improvement being means for providing reinforcement of the frame member by the handle member when the handle member is in a predetermined finally closed position relative to the frame member comprising tabs extending from each of the arms of one of said members towards the nearest arm of the other of said members, and notches formed in the arms of each of the other of said members, each said notches being positioned opposite an associated one of said tabs in mating engagement therewith when said handle member is in said finally closed position.

2. The buckle of claim 1 wherein the tabs extend outwardly from the arms of said frame member and said notches are formed in the arms of said lever member.

3. The buckle of claim 1 wherein the tabs extend inwardly from the arms of the lever member and the notches are formed in the arms of the frame member.

4. The buckle of claims 2 or 3 wherein said tabs extend from the top edges of their associated arms.

5. The buckle of claims 2 or 3 wherein said notches are formed in the top edges of their associated arms.

* * * * *